(12) United States Patent
Shishkin

(10) Patent No.: US 12,289,507 B2
(45) Date of Patent: Apr. 29, 2025

(54) NEUROMORPHIC COMPRESSIVE SENSING IN LOW-LIGHT ENVIRONMENT

(71) Applicant: Sensors Unlimited, Inc., Princeton, NJ (US)

(72) Inventor: Serge L. Shishkin, Marlborough, CT (US)

(73) Assignee: Sensors Unlimited, Inc., Princeton, NJ (US)

( * ) Notice: Subject to any disclaimer, the term of this patent is extended or adjusted under 35 U.S.C. 154(b) by 743 days.

(21) Appl. No.: 17/521,486

(22) Filed: Nov. 8, 2021

(65) Prior Publication Data

US 2024/0292074 A1    Aug. 29, 2024

(51) Int. Cl.
  *H04N 23/13*    (2023.01)
  *H04N 17/00*    (2006.01)
  *H04N 23/80*    (2023.01)

(52) U.S. Cl.
  CPC ........... *H04N 23/13* (2023.01); *H04N 17/002* (2013.01); *H04N 23/80* (2023.01)

(58) Field of Classification Search
  CPC ....... H04N 23/13; H04N 17/002; H04N 23/80
  See application file for complete search history.

(56) References Cited

U.S. PATENT DOCUMENTS

| | | | |
|---|---|---|---|
| 9,300,865 B2 | 3/2016 | Wang et al. | |
| 10,048,413 B2 | 8/2018 | Shishkin et al. | |
| 10,431,419 B2 | 10/2019 | Kovarik et al. | |
| 2010/0157082 A1* | 6/2010 | Katerberg | G03B 17/14 348/222.1 |
| 2016/0094787 A1 | 3/2016 | Govil et al. | |
| 2017/0098363 A1* | 4/2017 | Pickett | G01M 13/04 |
| 2017/0213364 A1* | 7/2017 | Sperl | G06T 11/005 |
| 2019/0289228 A1* | 9/2019 | Mazliach | G01J 3/2803 |
| 2021/0256314 A1 | 8/2021 | Javidi et al. | |

FOREIGN PATENT DOCUMENTS

| | | | |
|---|---|---|---|
| EP | 3393122 A1 | 10/2018 | |
| WO | WO-2018114868 A1 | 6/2018 | |
| WO | WO-2020163335 A1 | 8/2020 | |

OTHER PUBLICATIONS

Extended European Search Report of European Patent Application No. EP2205367.0, dated Mar. 16, 2023.

(Continued)

*Primary Examiner* — Thanh Luu
*Assistant Examiner* — Mai Thi Ngoc Tran

(57) ABSTRACT

A method is provided for reconstructing images or video from output of neuromorphic vision (NMV) sensors in a low-light environment. The method includes passively sensing light by an array of NMV sensors in the low-light environment, integrating the sensed light by each of the NMV sensors, outputting a time-stamped event signal per sensor of the array of NMV sensors upon a value of the integration exceeding a threshold value, resetting each NMV sensor after outputting an event signal for new integration of sensed light, combining the event signals, and reconstructing an image and/or video based on the combined event signals.

20 Claims, 5 Drawing Sheets

(56) References Cited

OTHER PUBLICATIONS

Dong, S., et al.: "Spike Camera and Its Coding Methods", arxiv.org, Cornell University Library, 201 Olin Library Cornell University Ithaca, NY 14853, Apr. 10, 2021 (Apr. 10, 2021), XP081934843.
Orchard G., et al.: "Real Time Compressive Sensing Video Reconstruction in Hardware", IEEE Journal on Emerging and Selected Topics in Circuits and Systems, IEEE, Piscataway, NJ, USA, vol. 2, No. 3, Sep. 1, 2012 (Sep. 1, 2012), pp. 604-615, XP011476083, ISSN: 2156-3357, DOI: 10.1109/JETCAS.2012.2214614.
Zhao Jing, et al.: "Spk2ImgNet: Learning to Reconstruct Dynamic Scene from Continuous Spike Stream", 2021 IEEE/CVF Conference on Computer Vision and Pattern Recognition (CVPR), IEEE, Jun. 20, 2021 (Jun. 20, 2021), pp. 11991-12000, XP034010849, DOI: 10.1109/CVPR46437.2021.01182 [retrieved on Oct. 15, 2021].
Han, J., et al., "Neuromorphic Camera Guided High Dynamic Range Imaging", Key Laboratory of Machine Perception (MOE), Dept. of Machine Intelligence, Peking University, National Engineering Laboratory for Video Technology, Dept. of Computer Science, Peking University, School of Computer Science, Faculty of Engineering, University of Sydney; Corresponding author: shiboxin@pku.edu.cn. 2020.
Kramer, J. et al., "Neuromorphic vision sensors and preprocessors in system applications", Institute of Neuroinformatics, Swiss Federal Institute of Technology/University of Zurich; Gloriastrasse 32, 8006 Zurich, Switzerland. 1990.

\* cited by examiner

NEUROMORPHIC COMPRESSIVE SENSING IN LOW-LIGHT ENVIRONMENT

BACKGROUND

1. Field of the Disclosure

The present disclosure relates to neuromorphic vision (NMV) sensing, and more particularly to neuromorphic compressive sensing in low-light environment.

2. Description of Related Art

Passive vision in low-light environment is required for many military applications, such as reconnaissance or hidden maneuvers. Conventional sensors (e.g., complementary metal oxide semiconductor (CMOS) image sensors) used in vision devices lose light information when operating in low-light conditions when intensity of the light is below a sensitivity threshold or above a saturation threshold of the sensor. Increasing sensitivity of the conventional sensor does not provide an efficient solution, as this can lead to more frequent saturation of the sensor when the light is not sufficiently low, causing a loss of light information. In addition, high sensitivity sensors are fragile and expensive and can output noisy signals.

In comparison to conventional sensors, event-based (neuromorphic vision (NMV)) sensors accumulate light energy. The accumulated light energy is integrated until the integration reaches some fixed threshold $\delta$. Upon reaching the threshold, a fixed binary signal is output (also referred to as the NMV sensor firing)' through a transmission line, and the integration process is reset. In a low-light setting, such sensors can have several advantages over conventional sensors.

Unlike conventional sensors, NMV sensors do not loose light information due to saturation. In other words, their dynamical range is significantly higher. NMV sensors are less affected by measurement noise in low-light settings. Additionally, binary signals output by NMV sensors are robust to transmission noise and require less energy and simpler hardware than non-binary signals.

Further advantages arise when polarization filters are used with NMV sensors for enhancing image reconstruction. Such polarization filters reduce light intensity. In a low-light environment, conventional sensors are more affected by this reduction of light intensity than NMV sensors.

However, image reconstruction from NMV sensor output remains challenged. To date, NMV systems recover an image for a particular pixel using only sensor information nearest to the location of the pixel and at the point in time that that pixel sensed an event. This leads to lesser quality of reconstructed images compared to images reconstructed from output of conventional sensors.

The reason for this reduction of image quality when reconstructed from NMV sensor output is that potential for information from NMV sensors is yet untapped. In particular, image and video signals produced using NMV sensors potentially have untapped hidden sparsity in spatial and temporal domains. Since video has significantly higher sparsity than images, the untapped hidden sparsity in spatial and temporal domains for video is greater than for images.

While conventional methods and systems have generally been considered satisfactory for their intended purpose, there is still a need in the art for vision systems to operate in low-light environments while overcoming the limitations of systems that use conventional sensors and methods and improving exploitation of available light information and yet untapped hidden sparsity in signals.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, disclosed is a method for reconstructing images or video from output of neuromorphic vision (NMV) sensors in a low-light environment. The method includes passively sensing light by an array of NMV sensors in the low-light environment, integrating the sensed light by each of the NMV sensors, outputting a time-stamped event signal per sensor of the array of NMV sensors upon a value of the integration exceeding a threshold value, resetting each NMV sensor after outputting an event signal for new integration of sensed light, combining the event signals, and reconstructing an image and/or video based on the combined event signals.

In accordance with one or more embodiments, reconstructing the event signals can use compressive sensing.

In accordance with one or more embodiments, combining the event signals can further includes converting the event signals output by the NMV sensors into a format that is compatible for an algorithm used to perform the compressive sensing.

In accordance with one or more embodiments, converting the event signals output by the NMV sensors into the format can include formatting the event signals output by the NMV sensors into a linear equation system having its matrix constructed using the event signals and identification of corresponding NMV sensors that output the respective event signals and locations of the NMV sensors of the array.

In accordance with one or more embodiments, the method can further include monitoring online health monitoring of the NMV sensors of the array using output from the compressive sensing independent of physical presence of the NMV sensors.

In accordance with one or more embodiments, the NMV sensors have different respective spectral ranges, wherein combining the event signals output can use spectral information about the spectral range of the neuromorphic vision sensor that outputs the corresponding signal.

In accordance with one or more embodiments, the NMV sensors have different respective spectral ranges, and the method can further comprise distributing in a random or semi-random manner the NMV sensors having different respective spectral ranges within the array prior to passive sensing by the NMV sensors.

In accordance with one or more embodiments, at least a portion of the array of NMV sensors include different types of polarization filters, each type of polarization filter filtering light at different respective angles and/or at least a portion of the array of NMV sensors being oriented to observe a scene from different respective angles, wherein the method further includes distributing in a random or semi-random manner the NMV sensors having the different types of polarization filters or being oriented at the different respective angles prior to passive sensing by the NMV sensors.

In accordance with one or more embodiments, the method can further include outputting the reconstructed image and/or video.

In accordance with one or more embodiments, the method can further include performing optimization of NMV array parameters using output from the compressive sensing, wherein the NMV array parameters include firing thresholds for enhancement of image quality and/or adaptation to changing light conditions and/or a particular application.

In another aspect of the disclosure, an NMV system is provided. The NMV system includes an array of NMV sensors configured to passively sense light, wherein the array of NMV sensors in disposed in a low-light environment and each of the NMV sensors integrates light sensed by the NMV sensor, outputs a time-stamped event signal upon a value of the integration exceeding a threshold value, and is reset for new integration of sensed light after outputting an event signal. The NMV system further includes a compressive sensing and reconstruction (CSR) engine for reconstructing images and/or video from output of an array of neuromorphic vision (NMV) sensors passively sensing light in a low-light environment. The CSR engine includes a memory configured to store instructions and a processor disposed in communication with said memory. The processor, upon execution of the instructions, is configured to receive event signals from the NMV sensors of the array, combine the event signals received, and reconstruct an image and/or video based on the combined event signals.

In a further aspect, a compressive sensing and reconstruction (CSR) engine is provided for reconstructing images and/or video from output of an array of NMV sensors passively sensing light in a low-light environment. The CSR engine includes memory configured to store instructions and a processor disposed in communication with said memory. The processor, upon execution of the instructions, is configured to receive event signals from the NMV sensors of the array, combine the event signals received, and reconstruct an image and/or video based on the combined event signals.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
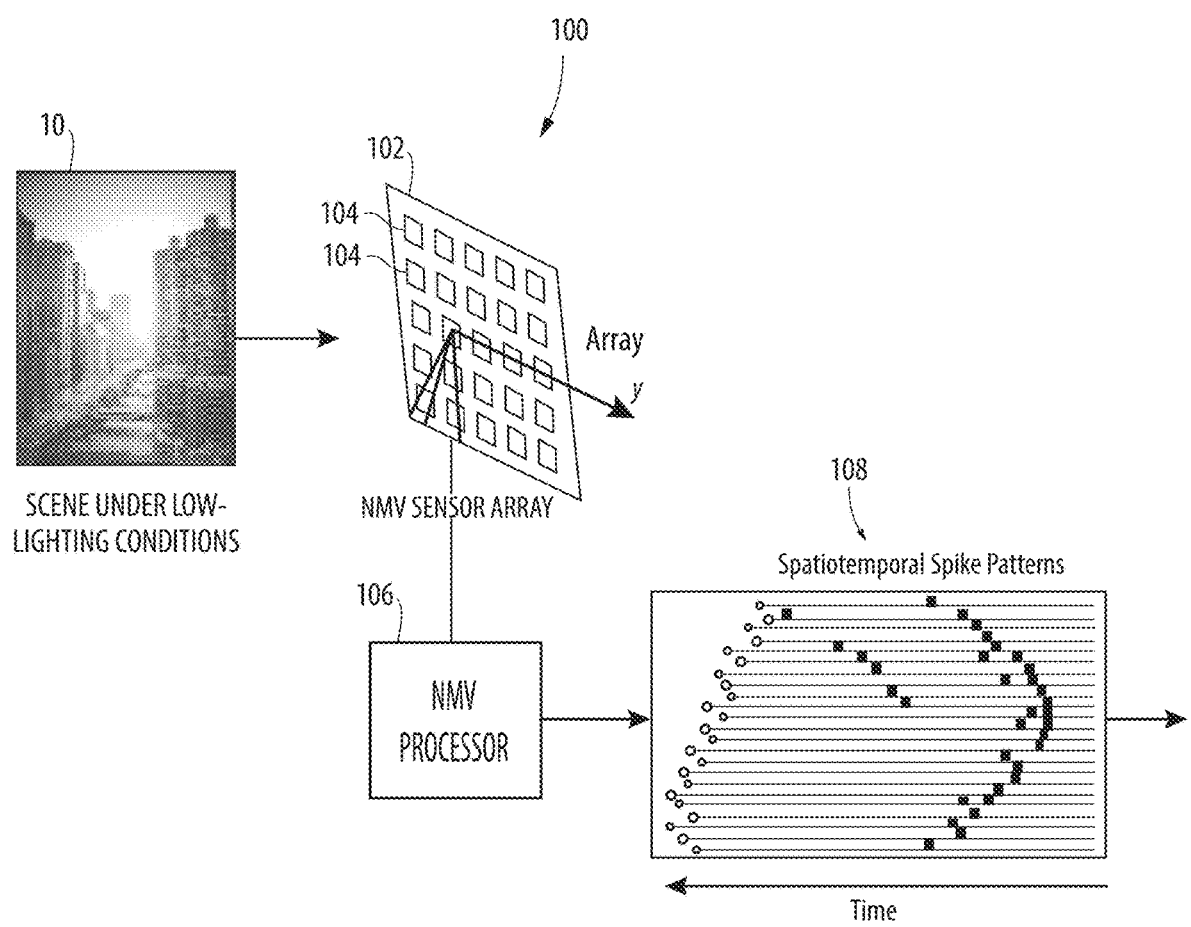
FIG. 1 is a schematic view of an exemplary embodiment of a neuromorphic vision (NMV) system, in accordance with embodiments of the disclosure.

Reference will now be made to the drawings wherein like reference numerals identify similar structural features or aspects of the subject disclosure. For purposes of explanation and illustration, and not limitation, a block diagram of an exemplary embodiment of a neuromorphic vision (NMV) system 100 in a low-lighting environment in accordance with the disclosure is shown in FIG. 1 and is designated generally by reference character 100. Methods associated with vision and of NMV system 100 and processing for applying compressive sensing to output of NMV system 100 in accordance with the disclosure, or aspects thereof, are provided in FIGS. 2-4, as will be described. The systems and methods described herein can be used to provide improved vision and imaging system, such as for military applications (e.g., reconnaissance or hidden maneuvers), navigation (autonomous or vision assistance), e.g., for driving, piloting, space travel, unmanned aerial vehicles, above or underwater marine navigation), personal or commercial security systems, wildlife observation systems, etc.

NMV system 100 is configured to sense light by an array of NMV sensors in a low-light environment, accumulate the sensed light, integrate the accumulated light for each of the NMV sensors, output event signals per NMV sensor and reset the corresponding NMV each time the integration has exceeded a threshold value. The event signals are provided for further processing in order to be reconstructed into an image.

NMV system 100 includes an NMV array 102 and NMV processor 106. NMV array 102 includes a plurality of sensors 104. The number of NMV sensors 104 included in NMV array 102 is not limited by the example shown in FIG. 1 and can be any number selected for the application used. NMV processor 106 stores information about each NMV sensor 104 in association with a sensor identification (ID). The information stored for each NMV sensor 104 can include, for example, location of the NMV sensor 104 within NMV array 102, spectral information about NMV sensor 104, polarization filter information about NMV sensor 104, orientation of NMV sensor 104, and any other information particular to NMV sensor 104 that can be used for performing compressive sensing and/or image reconstruction.

As explained in WIPO patent publication No. WO 2018/114868, image data may be output from a sensor array into a digital retina that converts that image data into "spikes" using various image processing and data processing techniques. The digital retina includes digital circuitry that generates spike data indicative of a spike in association with a particular photoreceptor within the sensor array whenever the intensity value measured by that photo receptor exceeds a threshold. The digital retina can be implemented using various solid-state technology including, for example, complementary metal-oxide-semiconductor (CMOS) implemented technology, which can include, for example, one or more field programmable, gate arrays (FPGAs), graphics processing units (GPUs), or functionally or structurally similar devices integrated circuits and associated software and/or firmware provided in, for example, application specific integrated circuits (ASICs).

NMV array 102 can be exposed to light reflected from a scene 10 in a low-light environment and respond by outputting event signals when triggered to do so. NMV processor 106 receives and processes event signals output by individual NMV sensors 104 each time that NMV sensor 104 is triggered to output an event signal. The event signal is a binary signal and includes identification (ID) information that identifies the NMV sensor that output the event signal. NMV processor 106 timestamps receipt of the event signal. NMV processor 106 stores spatiotemporal spike patterns (SSPs) 108, updating the SSPs 108 over time and outputting the SSPs 108 for processing in order that an image can be reconstructed from the SSPs. SSPs 108 can be output at regular intervals, upon request, or in response to satisfaction of a condition.

NMV sensors 104 sense and accumulate light. Even under low-light conditions, some light presents; even this small amount of light can be sensed and accumulated. Each NMV sensor 104 integrates the sensed light and stores an integrated charge until the integrated charge exceeds a predetermined threshold value. When the threshold value is exceeded, NMV sensor 104 outputs a binary signal to NMV processor 106 and is reset. The NMV sensor 104 can reset itself or can trigger an external device to reset the NMV sensor 104. Once reset, the NMV sensor 104 stores zero integrated charge and starts accumulating sensed light anew.

NMV sensors differ from conventional sensors in that unlike conventional sensors, NMV sensors do not merely compute a linear function of image brightness at a location of each sensing element, but processing uses a nonlinear mapping function, local spatiotemporal filtering, and adaptation. Kramer et al., *Neuromorphic Vision Sensors And Preprocessors In System Applications*, Proceedings of the SPIE, Volume 3410, p. 134-146 (1998).

In low light conditions, unlike conventional sensors, NMV sensors 104 have the ability to capture all available light information. There is no loss of light information, such as due to lack of sensitivity or saturation, as occurs in conventional sensors. NMV sensors 104 are sturdier and less expensive than high sensitivity conventional sensors, which tend to be expensive and fragile.

Further advantages over conventional sensors include a reduced quantity of signal transmission. Only event signals that accumulated enough light are sent from NMV sensors 104. Those NMV sensors 104 that did not yet accumulate enough light do not output event signals. Therefore, the amount of event signals is reduced compared to signals sent at regular intervals by conventional sensors, since all conventional sensors in an array transmit a signal at each interval, even when nothing is sensed. This difference is much more noticeable in low-light conditions when firing of NMV sensors is sparse and transmission of the binary output is inexpensive.

Another advantage relative to conventional sensors is that noise included in event signals is averaged during integration and thus is reduced. In addition, the binary signal used by the event signal is robust to transmission noise and requires less energy and simpler hardware than non-binary signals.

In normal light conditions, with regards to post-processing, compression of light information output by NMV sensor is lossy and non-optimal compared to raw data output using conventional compression methods such as JPEG. However, under low-light conditions, NMV sensors capture more light information than conventional sensors due to saturation in the latter. In addition, under low-light conditions enhanced compression (e.g., MPEG compression), traditionally used for images or videos, leads to expensive transmission while output of NMV sensors is sparse and its transition is inexpensive.

However, when compressive sensing techniques are available for application to raw event signals, there is no longer a need to for the raw event signals to compression methods, such as JPEG and MPEG, in order to be transmitted and stored. The ability to transmit and store raw event signals annuls the need for crosstalk between NMV sensors 104 or supervision of such crosstalk by a processing unit, which occurs in conventional compression methods, such as JPEG and MPEG.

Figure 2:
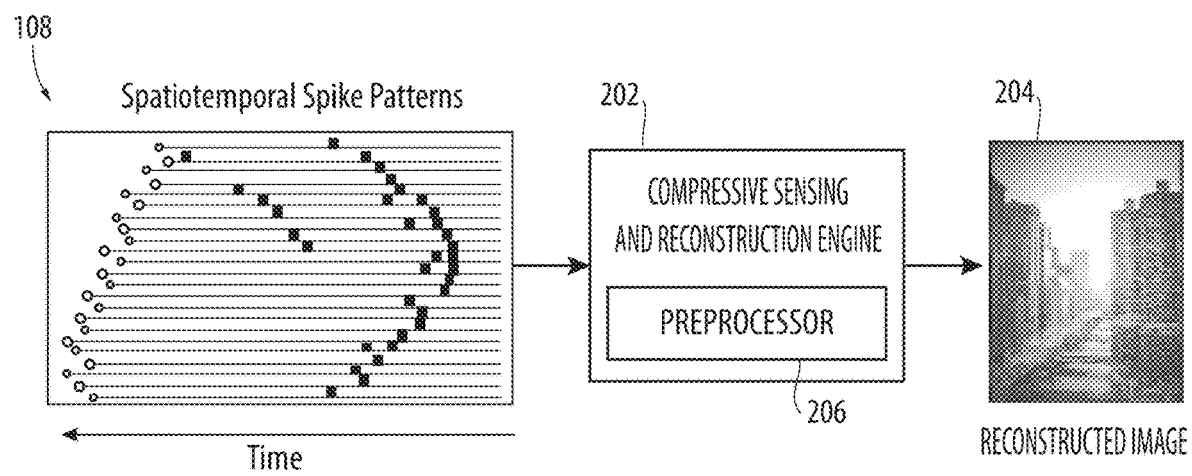
FIG. 2 is schematic diagram of reconstructive portion of the NMV system, in accordance with embodiments of the disclosure.

With reference to FIG. 2, a compressive sensing reconstruction (CSR) engine 202 receives the spatiotemporal spike patterns 108 and processes them with compressive sensing which is used for image reconstruction for output of a reconstructed image, such as example reconstructed image 206. Compressive sensing is currently used for recovering image, video, or other numerical fields from data using underlying sparsity of the unknown numerical field.

Based on existing technology, compressive sensing cannot be applied to raw event signals from NMV sensors. While compressive sensing is currently available for use with video and images, it assumes a matrix transforming light intensities into measurements is fixed a priori and that measurements are linear functions of light intensities. These assumptions imply a different structure of the problem to be solved by compressive sensing than is present in an NMV system. To illustrate, compressive sensing techniques currently available are unable to recovery images and/or video from data presented in the form of rare spikes, such as the output from NMV sensors 104.

Compressive sensing fusing CSR engine 202 includes a preprocessor 204 that prepares raw event signals output by NMV sensors 104 for compressive sensing and image and/or video reconstruction. The raw data includes time stamps of spikes output from NMV sensors 104 and identification of the corresponding NMV sensor 104 (which is used to retrieve location of the NMV sensor 104 in the NMV array 102) that output the spike. Preprocessor 204 constructs a matrix of linear equations and solves the constraint optimization problem using the raw data. The matrix of the linear equation system depends on sensed data, namely timestamps at which identified NMV sensors 204 fired, which results in a structure of the CS problem that is different from existing art.

Preprocessor 204 computes matrices A and F for linear system $AFa=\delta$, the linear system being integral to the optimization problem solved by CSR engine 202. Matrices A, F are constructed using data (time stamps of spikes and corresponding NMV sensor identification) from NMV sensors 204 and sensor locations. Preprocessor 204 correlates the number of spikes for each NMV sensor 104 (which is data-driven and is coordinated with construction of matrix A). Preprocessor 204 further uses a spatial sparsifying basis, such as Fourier and or Wavelet (the basis used is predetermined and does not change).

CSR engine 202 solves compressive sensing by minimizing non-zero components of a sparse vector under data-driven linear constraints and reconstructs an image(s) and/or video.

NMV processor 106, CSR engine 202, and/or preprocessor 204 can be integrated in a single device or share one or more hardware or software components. Additionally, NMV processor 106, CSR engine 202, and/or preprocessor 204 can be implemented as physical or virtual devices. Whether implemented as physical or virtual device(s), each of NMV processor 106, CSR engine 202, and/or preprocessor 204 uses a local or remote hardware processing device that executes software instructions, which enables performance of the disclosed functions.

Communication between NMV processor 106, CSR engine 202, and/or preprocessor 204 can include wired or wireless communication, which can include communication via a network, such as an intranet, a local area network (LAN), and/or a wide area network (WAN).

Figure 3:
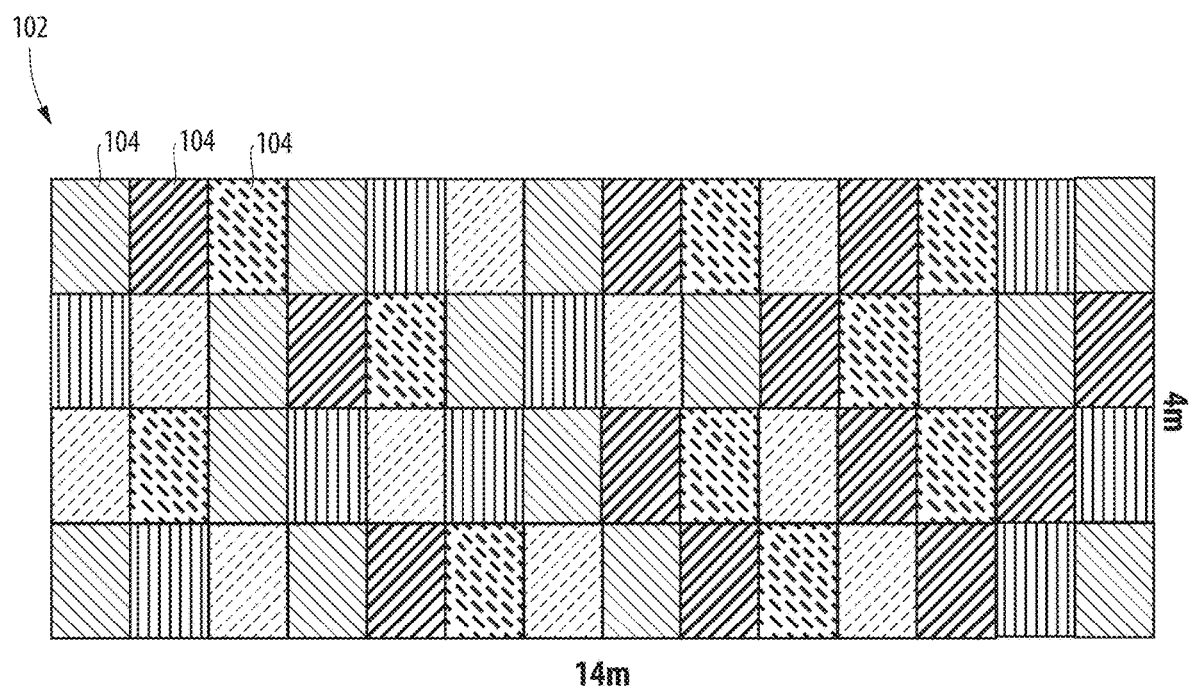
FIG. 3 is a schematic diagram of the NMV system showing an arrangement of NMV sensors in accordance with embodiments of the disclosure.

With reference to FIG. 3, application of CS to the raw event data is effective regardless of the configuration of array 102. NMV sensors 102 can be positioned in a regular grid configuration, in a completely random configuration, or something between these two configurations. Individual NMV sensors 104 can be configured to have a different respective spectral ranges, use polarization filters of different respective types (wherein each type of polarization filter filters light at a different angle), and/or have different respective orientations for different angles of observation of a scene. Distribution of NMV sensors 104 having different spectral ranges, polarization, and/or orientation can be in accordance with a pattern, groupings, random, or some combination of thereof.

In comparison with conventional sensors, although polarization sensing can be desirable because it can produce significant advantages for image reconstruction, polarization filters are not suitable for low light environment due to light reduction caused by polarization filters. However, polarization filters do not have a negative effect when used with NMV sensors 104, since the light threshold in NMV can be adjusted to compensate for loss of light in polarization filter, and the advantages of polarization filtering can still be had.

Whereas in conventional sensors that provide multispectral vision, when an individual rectangular sensor array is used for each spectral range, there is either an increase in the number of sensors used or there is a reduction in resolution. This is because conventional sensors operate based on local information in which the conventional sensors provide light information at a specified location of the conventional sensor. There is a blind spot at any location that does not have a sensor.

However, when using compressive sensing to process raw event signals output by NMV sensors 104, there is no need in NMV array 102 for NMV 104 sensors to be grouped in rectangle according to spectral range. This is because compressive sensing operates with image/video as a whole and recovers it as a solution of an optimization problem. Coordinates of NMV sensors 104 are only used when constructing the linear equation system. When a sensor is removed, a row in the linear equation system is removed. Similarly, if an NMV sensor 104 is added or moved, coefficients of corresponding linear equations are adjusted. A missing NMV sensor 104 may have some effect on the solution, but does not lead to a blind spot. This freedom of distribution allows for multispectral vision without an increase in the number of sensors used or a reduction in resolution.

Whereas health monitoring of individual conventional sensors uses extra hardware, this affects the cost, weight, size, energy consumption and overall complexity of the vision system. However, when using compressive sensing to process raw event signals output by NMV sensors, monitoring of NMV array 102 can be performed by emulating sensor responses from recovered video signal, comparing actual NMV sensor responses with the emulated sensor responses, and determining whether any difference there between indicates dysfunctionality of an NMS sensor 104.

More particularly, when using compressive sensing, any NMV sensor 104 can be removed from consideration without physically removing the NMV sensor 104. Predictions can be made of output for that NMV sensor 104 and the prediction can be compared with actual output. Furthermore, accuracy of the prediction can be estimated. If a difference between actual and predicted output exceeds prediction accuracy, and especially if it does so consistently, then it is likely that something is wrong with the NMV sensor 104. In addition, outlier data is readily distinguishable upon solving the optimization problems, wherein outlier data is output from NMV sensors 104 that are suspected to be defective. In this way, the NMV sensors 104 can be monitored independent of physical presence of the NMV sensors.

When an NMS sensor 104 is deemed dysfunctional, its output can be excluded from future processing for image reconstruction. No physical changes need to be made to the NMV sensor array 102. With returned reference to FIG. 2, the mathematical solution applied by preprocessor 204 to NMV output from NMV sensors 104 is described in greater detail. NMV sensors 104 of NMV array 102 are modelled as a set of n individual event-based sensors distributed in 2D domain $\Omega$. It is assumed that the process is observed on a time interval [0, T]. A goal is to reconstruct a light intensity field L(x, y, t) dynamically at location x, y at time t over the whole domain $\Omega \times [0, T]$.

No limitations are made on sensor placement, meaning within 2D domain $\Omega$, NMV sensors 104 can be laid in a regular grid, or by completely random distribution or something between these two extremities. Coordinates of an $i^{th}$ sensor of NMV sensors 104 are denoted by $(x_i, y_i)$. Integration of a data signal for each sensor i at moment t is represented using Equation (1):

$$q_i(t) = \int_0^t L(x_i, y_i, s)ds, i = 1, \ldots, n \qquad (1)$$

Let $t_{i,1}, \ldots, t_{i,n}$ denote times when neuromorphic encoder for sensor i "fires" an event signal 1, . . . , n. Correspondingly, $N_i$ is a total number of signals received from $i^{th}$ sensor on time interval [0, T]. A definition of neuromorphic encoding is represented by Equation (2):

$$q_i(t_{i,j+1}) - q_i(t_{i,j}) = \delta \text{ for any } i = 1, \ldots, n; j = 1, \ldots, N_i - 1 \qquad (2)$$

By definition of Equation (1), the difference in the left-hand term is a light signal accumulated between two consecutive firings of an NMV sensor i at the moments $t_{i,j}$ and $t_{i,j+1}$. This difference must be equal to $\delta$ in order for there to be a firing at moment $t_{i,j+1}$.

Equation (2) can be equivalently rewritten in a form that describes a linear equation system, as represented by Equation (3):

$$Aq = \delta e, \qquad (3)$$

where $q = \text{col}(q_1(t_{1,1}), \ldots, q_1(t_{1,N_1}), q_2(t_{1,N_2}), \ldots, q_1(t_{2,N_2}), \ldots, q_n(t_{n,1}), \ldots, q_n(t_{n,N_n}))$.

$$e = \text{col}(1, \ldots, 1) \in \mathbb{R}^N, N = \sum_{i=1}^{n} \max(N_i - 1, 0),$$

$A = \text{diag}(A_{N_1}, \ldots, A_{N_n})$,
$\delta$ = the threshold for integration
$\mathbb{R}$ = the space of real numbers $$A_i = \begin{bmatrix} -1 & 1 & 0 & \ldots & 0 & 0 & 0 \\ 0 & -1 & 1 & \ldots & 0 & 0 & 0 \\ \vdots & \vdots & \vdots & \ddots & \vdots & \vdots & \vdots \\ 0 & 0 & 0 & \ldots & -1 & 1 & 0 \\ 0 & 0 & 0 & \ldots & 0 & -1 & 1 \end{bmatrix} \in \mathbb{R}^{(N_i-1) \times N_i}, i = 1, \ldots, n$$

Equation (3) is a unity of equations (2) written for all sensors and all firing times and organized in matrix form.

The problem is formulated as reconstruction of the light field Q(x, y, t) under the conditions represented by Equation (3).

Reconstruction of a light intensity field from neuromorphically encoded signals is now discussed, in particular a reconstruction method for a field Q(x, y, t) of light intensities. Light field Q(x, y, t) is image/video to be restored. Light field Q(x, y, t) is static for restoration of an image and dynamic for restoration of video over a time interval (as opposed to a momentous scene). For each reconstruction process, which can be performed at discrete time intervals for reconstruction of video, light field Q(x, y, t) is fixed, either as a fixed image or as a video over a fixed time interval. Within reconstruction, light field Q(x, y, t) does not change. When a scene captured by NMV array 102 is a dynamic scene, reconstruction is repeated successively and processed in real time, also referred to as online, the reconstruction instances recovering video over respective, successive time intervals.

Scene reconstruction can be expressed as a problem of recovering a signal from sparse measurement. Compressive sensing methods are described in Candès, et. al., "Stable signal recovery from incomplete and inaccurate measurements", Communications on Pure and Applied Mathematics, 59 (8): 1207-1223, arXiv:math/0503066 (2006). A main assumption behind this approach is sparsity of the signal in some appropriate basis. Practice shows that this assumption holds for video signal expansions in Fourier and Wavelet bases.

Following compressing sensing methodology as described by Qaisar, et. al., Compressive sensing: From theory to applications, a survey, IEEE Journal of Communications and Networks, Volume 15, Issue 5, pp. 443-45 (2013), a basis $B_1, \ldots, B_M : \Omega \times [0, T] \to \mathbb{R}$ is used that allows sparse representation of Q, as represented by Equation (4), which is a conceptual step as follows:

$$Q(x, y, t) \approx \sum_{i=1}^{M} a_i B_i(x, y, t) \text{ for any } (x, y) \in \Omega, t \in [0, T] \quad (4)$$

where vector $a = \text{col}(a_1, \ldots, a_M)$ is a sparse vector, meaning a vector with relatively few non-zero components. Equation (4) expresses that image/video Q(x, y, t) can be presented as a linear combination of relatively few functions from the chosen basis $\{B_i\}$, such as Fourier basis or Wavelet basis, or any basis that allows representation of image/video in the form of Equation (4) with vector a being a sparse vector. $B_i(x, y, t)$ are elements of the chosen basis, e.g., Fourier functions for Fourier basis, Wavelets for Wavelet basis, etc., without limitation to a specific basis. Fourier basis is selected, for example, as the spatial sparsifying basis. The Fourier basis has some advantages. First, Fourier basis is successfully used for sparsification in many image-related and/or physics-based practical applications (e.g., JPEG coding). Second, sparse Fourier transformation can be done more efficiently than a transformation associated with other standard sparsifying bases, as described by Hassanieh, et al., Optimal Sparse Fourier Transform, arXiv: 1201.2501 [cs.DS], (April 2012).

Combining Equations (3) and (4) (also referred to as combining the event signals output by the NMV sensors, wherein the combination is formatted into a format that is compatible for an algorithm used to perform compressive sensing) the reconstruction problem can be formulated as represented by Problem (5):

$$\text{minimize}_{a \in \mathbb{R}^M} \|a\|_0 \text{ such that } AFa = \delta e \quad (5)$$

where $\|a\|_0$ is $L_0$ norm of vector a (wherein $L_0$ is the number of non-zero components in the vector a), $$F = \begin{bmatrix} F_1(x_1, y_1, t_{1,1}) & \ldots & F_M(x_1, y_1, t_{1,1}) \\ \vdots & \ddots & \vdots \\ F_1(x_1, y_1, t_{1,N_1}) & \ldots & F_M(x_1, y_1, t_{1,N_1}) \\ F_1(x_2, y_2, t_{2,1}) & \ldots & F_M(x_2, y_2, t_{2,1}) \\ \vdots & \ddots & \vdots \\ F_1(x_n, y_n, t_{n,N_n}) & \ldots & F_M(x_n, y_n, t_{n,N_n}) \end{bmatrix}$$

$$F_i(x, y, t) = \int_0^T B_i(x, y, s) ds, i = 1, \ldots, n; (x, y) \in \Omega; t \in \mathbb{R}$$

With notations as introduced, Equation (4) can be written in the form q=Fa. Substituting q=Fa in Equation (3) provides: $AFa = \delta e$, which is the constraint provided in Problem (5). Problem (5) thus captures all information obtained from the NMV sensors 104, including times of spikes and the locations of the NMV sensors, formatted and expressed in a language that is compatible with compressive sensing. Thus in Problem (5) the number of non-zero terms is minimized in sparse representation Equation (4) of the image/video under the constraint that summarizes the measurements.

It is noted that sensing matrix AF is not set a priori, but rather is a data-dependent matrix that is dynamic over time, depending on measured signals. The measured signals are points in time when spikes are issued by identified NMV sensors. Solving the mathematical problem represented by Problem (5), image Q is reconstructed.

Methods for solving the optimization problem represented by Problem (5) are now described. Problem (5) is relaxed to a convex though non-differentiable problem. Several examples of such problems are represented in Problems (6)-(8):

$$\text{minimize}_{a \in \mathbb{R}^M} \|a\|_* \text{ such that } \|AFa - \delta e\|_\# \leq \varepsilon \qquad (6)$$

$$\text{minimize}_{a \in \mathbb{R}^M} \|a\|_* + \lambda \|AFa - \delta e\|_\# \qquad (7)$$

$$\text{minimize}_{a \in \mathbb{R}^M} \|AF\alpha - \delta e\|_\# \text{ such that } \|\alpha\|_* \leq \varepsilon \qquad (8)$$

where $\lambda, \varepsilon$ are positive coefficients fixed a priori, $\|a\|^*$ is sparsity-inducing norm of vector a, e.g., $L_1$ norm, $\| \|_{ii}$ is any norm, most commonly $L_2$ norm.

Correctness of relaxations of the problem represented by Problem (5) to one of the forms represented by Problem (6)-(8) depends on properties of the matrix (AF). Both theory and practice favor that matrix (AF) be created by sensors distributed randomly and independently over a domain, as described by King et. al., Image Inpainting: Theoretical Analysis and Comparison of Algorithms, XV SPIE Conf. on Wavelets and Sparsity, San Diego, CA, 2013 and cited references, wherein King et al., is incorporated by references herein in its entirety.

Any of Problems (6)-(8) can be solved by highly efficient methods, as described by Beck et al., A Fast Dual Proximal Gradient Algorithm for Convex Minimization and Applications and Nesterov, Universal Gradient Methods for Convex Optimization Problems, Math. Programming, Volume 152, Issue 1-2, pp 381-404 (2015). In the case when high convergence speed rather than high accuracy of the solution is needed, Split-Bregman method is often used, as described by Goldstern et al., The Split Bregman Method for L1 Regularized Problems, UCLA Tech Report (2009) and Shishkin, Fast and Robust Compressive Sensing Method Using Mixed Hadamard Sensing Matrix, IEEE Journal on Emerging and Selected Topics in Circuits and Systems, Vol. 2, no 3, pp. 353-361 (2012).

Accordingly, measurements from an array of NMV sensors when processed using Equations (1)-(4) is converted into a form that is compatible with compressive sensing and optimization equations represented by Problems (5)-(8). The ability to apply compressive sensing to the output of NMV sensors is critical to image reconstruction from NMV sensor output. In this way, images and video can be recovered using a passive vision system that senses passively while operating in a low-light environment.

Once the image is reconstructed, online health monitoring of the sensors may be performed by identification and isolation of NMV sensors 104 which output signals that correspond to outliers in objective functions represented by Problems (6)-(8).

The method can be combined with a method described in U.S. Pat. Nos. 9,300,865 and 10,048,413, each of which is incorporated herein by reference in their entirety. This combination would provide a computationally efficient method for multi-spectral and/or multi-polarization imaging using a same number of NMV sensors as would be used for single-spectral imaging and/or non-polarized imaging using an array of conventional sensors.

Figure 4:
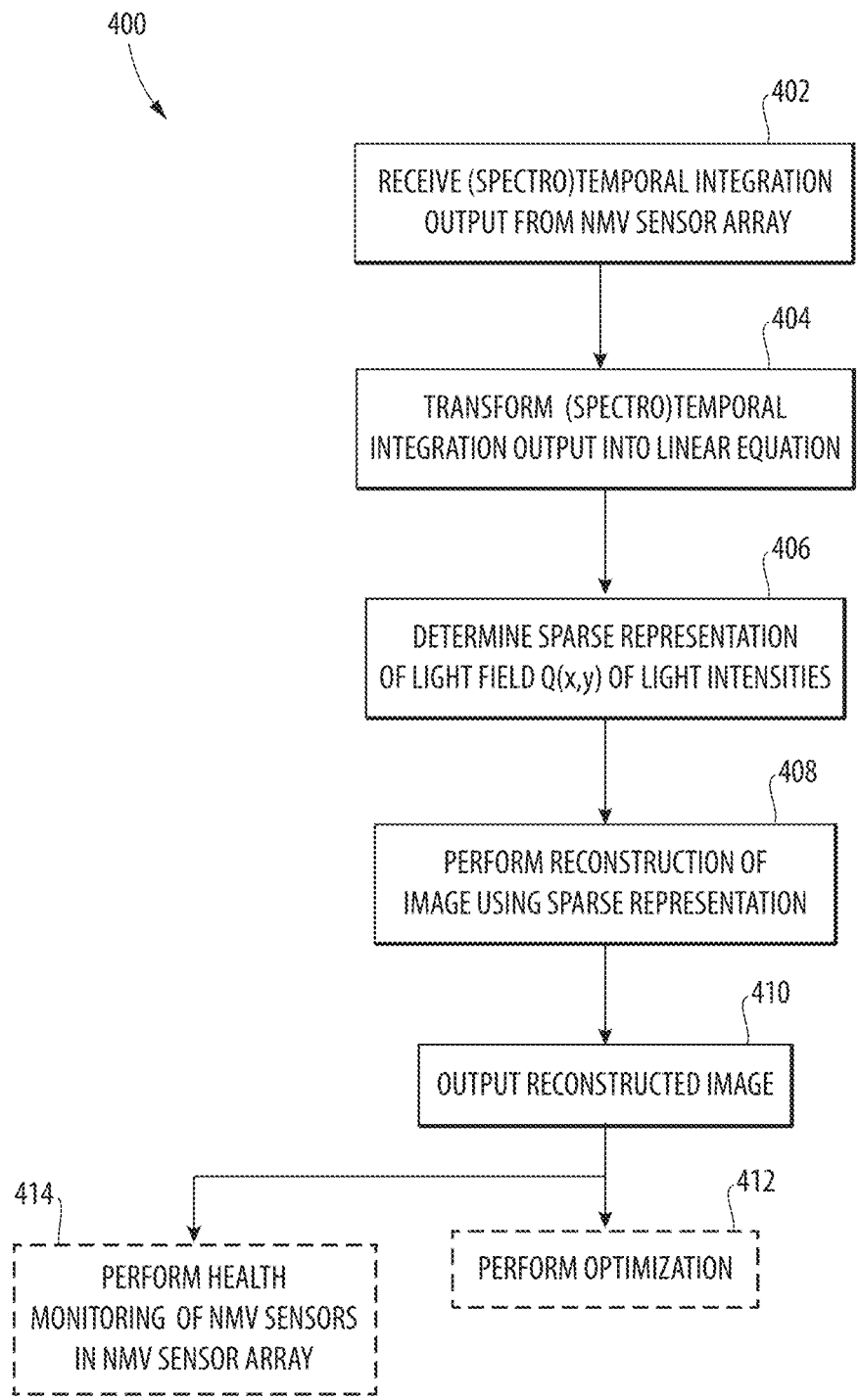
FIG. 4 is a flowchart showing a method performed by a compressive sensing and reconstruction engine of the NMV system, in accordance with embodiments of the disclosure.

FIG. 4 shows an exemplary and non-limiting flowchart 400 illustrating a method for applying compressive sensing to raw event data from NMV sensors, such as NMV sensors of NMV system 100 shown in FIGS. 1 and 3, and reconstructing an image and/or video in accordance with certain illustrated embodiments. The event data includes (spectro) temporal spike patterns that imply spatial information based on identification of NMV sensors that output corresponding event data. The event data can include spectral data or can be monochromal. The method can be performed by CSR engine 202 shown in FIG. 2. Before turning to description of FIG. 4, it is noted that the flowchart in FIG. 4 shows an example in which operational steps are carried out in a particular order, as indicated by the lines connecting the blocks, but the various steps shown in this diagram can be performed in a different order, in parallel, or in a different combination or sub-combination. It should be appreciated that in some embodiments some of the steps described below may be combined into a single step. In some embodiments, one or more additional steps may be included. In some embodiments, one or more of the steps can be omitted.

At block 402, temporal integration output, including time stamps $t_1, \ldots, t_{Nn}$, is received from NMV sensors of an NMV sensor array, such as NMV sensors 204 and NMV sensor array 202 shown in FIG. 2. The timestamps are used for construction of the matrix F and matrix A used in Problem (5). In one or more embodiments, the temporal integration output can be (spectro)temporal, as the integration output can be integrated over spectrum. Furthermore, the integration output can be dynamic over time and can be received and processed in real time.

At block 404, temporal integration output, such as temporal spike patterns shown in FIGS. 1 and 2, is transformed into a system of linear equations. This process of block 404 is described above with respect to Equations (2-3). The transformation into a system of linear equations can be dynamic over time and can be performed in real time.

The process of block 406 is described above with respect to conceptual Equation (4), such as by construction of matrix F as applied in Problem (5). The sparse representation of light field Q(x, y, t) implied by the matrix F can be dynamic over time and can be received and processed in real time.

At block 408, reconstruction of an image is performed using sparse representation. The reconstruction can be dynamic over time and can be processed in real time. At block 410, the reconstructed image is output, such as for display by a display device. Output of the reconstructed image can be dynamic over time and can be output in real time such that the output is video. At block 412, optimization of the NMV system parameters, such as adjustments to firing thresholds, can be performed, with an objective of enhancement of image quality or adaptation of the NMV system to changing light conditions or the needs of a particular application (such as navigation). The optimization can be performed in real time. At block 414, health monitoring of the NMV array can be performed. The health monitoring can be performed in real time. Blocks 412 and 414 are shown in dotted lines as an indication that they are optional and/or can be performed in parallel with one or another or blocks 402-410.

Aspects of the present disclosure are described above with reference to block diagrams of methods, apparatus (systems) and computer program products according to embodiments of the disclosure. Features of the methods described include operations, such as equations, transformations, conversions, etc., that can be performed using software, hardware, and/or firmware. Regarding software implementations, it will be understood that individual blocks of the block diagram illustrations and combinations of blocks in the block diagram illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block diagram block or blocks.

It is to be appreciated the embodiments of the disclosure include software algorithms, programs, or code that can reside on a computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the logic, equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Figure 5:
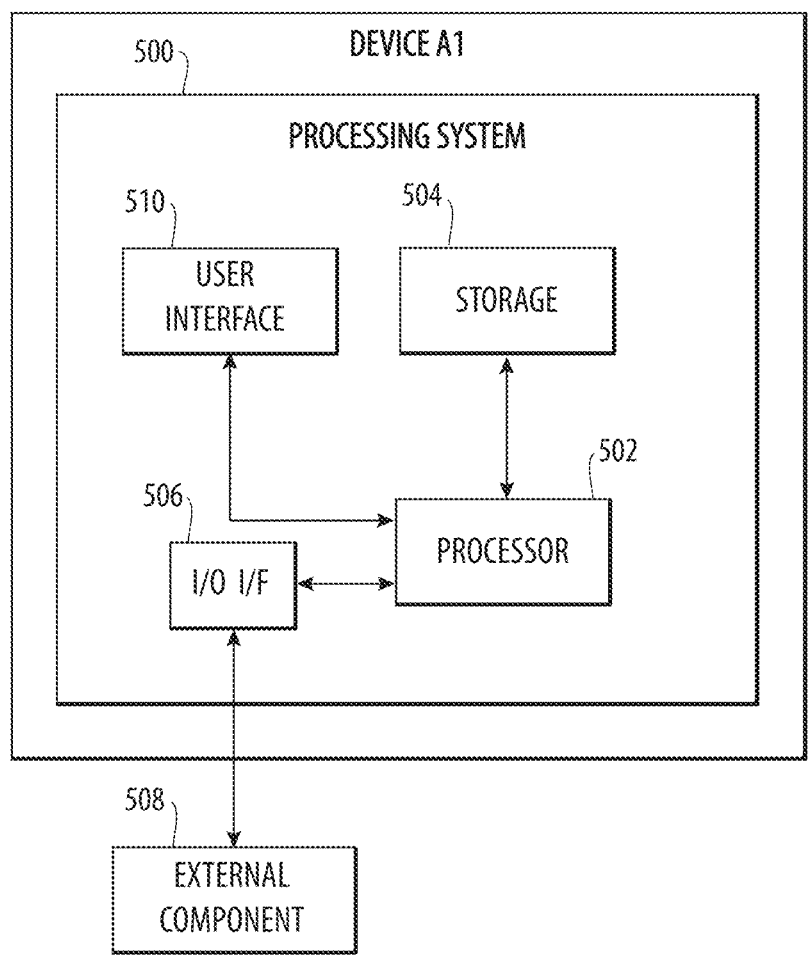
FIG. 5 is a block diagram of an exemplary system computer system for implementing processing functions of the NMV system.

With reference to FIG. 5, a block diagram of an example computing system 500 is shown, which provides an example for configuration of NMV processor 106, CSR engine 202, and/or preprocessor 204, any of which can optionally be embedded in a Device A1. Additionally, all or portions of NMV processor 106, CSR engine 202, and/or preprocessor 204 could be configured as software, and computing system 500 could represent such portions. Computing system 500 is only one example of a suitable system and is not intended to suggest any limitation as to the scope of use or functionality of embodiments of the disclosure described herein. Computing system 500 can be implemented using hardware, software, and/or firmware. Regardless, computing system 500 is capable of being implemented and/or performing functionality as set forth in the disclosure.

Computing system 500 is shown in the form of a general-purpose computing device. Computing system 500 includes a CPU/Processor 502, storage 504, an input/output (I/O) interface (I/F) 506 that can communicate with an internal component, such as optionally a user interface 510 and optionally an external component 508.

The CPU/Processor 502 can include, for example, a Programmable Logic Device (PLD), a microprocessor, a DSP, a microcontroller, an FPGA, an ASIC, and/or other discrete or integrated logic circuitry having similar processing capabilities. The CPU/Processor 502 and the storage 504 can be included in components provided in an FPGA, ASIC, microcontroller, or microprocessor, for example. Storage 504 can include, for example, volatile and nonvolatile memory for storing data temporarily or long term, and for storing programmable instructions executable by the CPU/Processor 502. Storage 504 can be a removable (e.g., portable) memory for storage of program instructions. I/O I/F 506 can include an interface and/or conductors to couple to the one or more internal components 510 and/or external components 508.

Computer system 500 is only one example of a suitable system and is not intended to suggest any limitation as to the scope of use or functionality of embodiments of the disclosure described herein. Regardless, computer system 500 is capable of being implemented and/or performing any of the functionality set forth hereinabove.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the block diagram block or blocks.

Computer system 500 is only one example of a suitable system and is not intended to suggest any limitation as to the scope of use or functionality of embodiments of the disclosure described herein. Regardless, computer system 500 is capable of being implemented and/or performing any of the functionality set forth hereinabove.

Computer system 500 may be described in the general context of computer system-executable instructions, such as program modules, being executed by a computer system. Generally, program modules may include routines, programs, objects, components, logic, data structures, and so on that perform particular tasks or implement particular abstract data types.

While the disclosure has been described with reference to an exemplary embodiment(s), it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment(s) disclosed, but that the disclosure will include all embodiments falling within the scope of the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

A potential advantage of the various embodiments of the NMV system disclosed is the ability to provide passive vision capabilities in low-light environment which could not be previously obtained by conventional vision systems.

While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A method of imaging comprising:
passively sensing light by a multi-dimensional array of neuromorphic vision (NMV) sensors in a low-light environment, wherein different NMV sensors have different spectral ranges and are distributed in a random or semi-random manner within the multi-dimensional array of NMV sensors;
integrating the sensed light by each of the NMV sensors;
outputting a time-stamped event signal per NMV sensor of the multi-dimensional array of NMV sensors upon a value of the integration exceeding a threshold value;
resetting each NMV sensor after outputting the time-stamped event signal for new integration of sensed light;
combining the time-stamped event signals; and
reconstructing at least one of an image or a video based on the combined time-stamped event signals using compressive sensing.

2. The method of claim 1, wherein combining the time-stamped event signals includes converting the time-stamped event signals output by the NMV sensors into a format that is compatible for an algorithm used to perform the compressive sensing.

3. The method of claim 2, wherein converting the time-stamped event signals output by the NMV sensors into the format includes formatting the time-stamped event signals output by the NMV sensors into a linear equation system having a matrix of linear equations constructed using the time-stamped event signals and identification of corresponding NMV sensors that output the respective time-stamped event signals and locations of the NMV sensors of the multi-dimensional array.

4. The method of claim 1, further comprising:
performing online health monitoring of the NMV sensors of the multi-dimensional array using output from the compressive sensing independent of physical presence of the NMV sensors.

5. The method of claim 1, wherein combining the time-stamped event signals uses spectral information about the spectral range of the NMV sensor that outputs each corresponding time-stamped event signal.

6. The method of claim 1, wherein:
at least some of the NMV sensors include different types of polarization filters;
each type of polarization filter is configured to filter light at different respective angles and/or at least a portion of the multi-dimensional array of NMV sensors is oriented to observe a scene from different respective angles; and
the method further includes distributing in a random or semi-random manner the NMV sensors having the different types of polarization filters and/or being oriented at the different respective angles prior to passive sensing by the NMV sensors.

7. The method of claim 1, further comprising:
outputting at least one of the reconstructed image or video.

8. The method of claim 6, wherein, for each NMV sensor having a polarization filter, the threshold value is adjusted to compensate for a light loss from the polarization filter.

9. The method of claim 7, wherein, when at least one NMV sensor of the multi-dimensional array of NMV sensors becomes inoperative, the reconstructed image or video does not include a blind spot at a location corresponding to the at least one inoperative NMV sensor.

10. A method of imaging comprising:
passively sensing light by an array of neuromorphic vision (NMV) sensors in a low-light environment;
integrating the sensed light by each of the NMV sensors;
outputting a time-stamped event signal per NMV sensor of the array of NMV sensors upon a value of the integration exceeding a threshold value;
resetting each NMV sensor after outputting the time-stamped event signal for new integration of sensed light;
combining the time-stamped event signals;
reconstructing at least one of an image or a video based on the combined time-stamped event signals; and
performing optimization of NMV array parameters using output from compressive sensing, wherein the NMV array parameters include firing thresholds for enhancement of image quality or adaptation to changing light conditions and/or a particular application.

11. A neuromorphic vision (NMV) system comprising:
a multi-dimensional array of NMV sensors configured to passively sense light, wherein the multi-dimensional array of NMV sensors is configured to be used in a low-light environment, wherein each of the NMV sensors is configured to integrate light sensed by the NMV sensor, output a time-stamped event signal upon a value of the integration exceeding a threshold value, and be reset for new integration of sensed light after outputting the time-stamped event signal, wherein different NMV sensors have different spectral ranges and are distributed in a random or semi-random manner within the multi-dimensional array of NMV sensors; and
a compressive sensing and reconstruction (CSR) engine configured to reconstruct at least one of an image or video from output of the multi-dimensional array of NMV sensors, the CSR engine comprising:
at least one memory configured to store instructions; and
at least one processor disposed in communication with the at least one memory, wherein the at least one processor, upon execution of the instructions, is configured to:
receive the time-stamped event signals from the NMV sensors of the multi-dimensional array;
combine the time-stamped event signals received; and
reconstruct at least one of the image or video based on the combined time-stamped event signals using compressive sensing.

12. The NMV system of claim 11, wherein, to combine the time-stamped event signals, the at least one processor, upon execution of the instructions, is configured to convert the time-stamped event signals output by the NMV sensors into a format that is compatible for an algorithm used to perform the compressive sensing.

13. The NMV system of claim 12, wherein, to convert the time-stamped event signals output by the NMV sensors into the format, the at least one processor, upon execution of the instructions, is configured to format the time-stamped event signals output by the NMV sensors into a linear equation system having a matrix of linear equations constructed using the time-stamped event signals and identification of corresponding NMV sensors that output the respective time-stamped event signals and locations of the NMV sensors of the multi-dimensional array.

14. The NMV system of claim 11, wherein the at least one processor, upon execution of the instructions, is further configured to perform online health monitoring of the NMV sensors of the multi-dimensional array using output from the compressive sensing independent of physical presence of the NMV sensors.

15. The NMV system of claim 11, wherein, to combine the time-stamped event signals, the at least one processor, upon execution of the instructions, is configured to use spectral information about the spectral range of the NMV sensor that outputs each corresponding time-stamped event signal.

16. The NMV system of claim 11, wherein:
at least some of the NMV sensors include different types of polarization filters;
each type of polarization filter is configured to filter light at different respective angles and/or at least a portion of the multi-dimensional array of NMV sensors is oriented to observe a scene from different respective angles; and
the NMV sensors having the different types of polarization filters and/or being oriented at the different respective angles are distributed in a random or semi-random manner prior to passive sensing by the NMV sensors.

17. The NMV system of claim 16, wherein the at least one processor, upon execution of the instructions, is further configured to adjust, for each NMV sensor having a polarization filter, the threshold value to compensate for a light loss from the polarization filter.

18. The NMV system of claim 11, wherein, when at least one NMV sensor of the multi-dimensional array of NMV sensors becomes inoperative, the reconstructed image or video does not include a blind spot at a location corresponding to the at least one inoperative NMV sensor.

19. A compressive sensing and reconstruction (CSR) engine for reconstructing at least one of images or video from output of a multi-dimensional array of neuromorphic vision (NMV) sensors passively sensing light in a low-light environment, the CSR engine comprising:
at least one memory configured to store instructions;
at least one processor disposed in communication with the at least one memory, wherein the at least one processor, upon execution of the instructions, is configured to:
receive time-stamped event signals output by the NMV sensors of the multi-dimensional array, wherein the NMV sensors are configured to passively sense light, integrate the sensed light by each of the NMV sensors, output a time-stamped event signal upon a value of the integration exceeding a threshold value, and be reset for new integration of sensed light, and wherein different NMV sensors have different spectral ranges and are distributed in a random or semi-random manner within the multi-dimensional array of NMV sensors;
convert the time-stamped event signals output by the NMV sensors into a format that is compatible for an algorithm used by compressive sensing; and
reconstruct at least one of an image or a video using compressive sensing based on the converted time-stamped event signals.

20. The CSR engine of claim 19, wherein, to convert the time-stamped event signals output by the NMV sensors into the format, the at least one processor, upon execution of the instructions, is configured to format the time-stamped event signals output by the NMV sensors into a linear equation system having a matrix of linear equations constructed using the time-stamped event signals and identification of corresponding NMV sensors that output the respective time-stamped event signals and locations of the NMV sensors of the multi-dimensional array.

* * * * *